they cited# United States Patent
Griffin

[15] 3,695,053
[45] Oct. 3, 1972

[54] DILUTION SYSTEM FOR ABSORPTION REFRIGERATION SYSTEMS

[72] Inventor: Charles K. Griffin, Auburn, N.Y.

[73] Assignee: Carrier Corporation, Syracuse, N.Y.

[22] Filed: July 28, 1971

[21] Appl. No.: 16,689

[52] U.S. Cl. ................................................. 62/103
[51] Int. Cl. ............................................. F25b 15/06
[58] Field of Search ................ 62/101, 103, 141, 476

[56] References Cited

UNITED STATES PATENTS

| | | | |
|---|---|---|---|
| 3,550,391 | 12/1970 | Greacen | 62/141 X |
| 3,604,216 | 9/1971 | Porter | 62/141 |
| 3,620,036 | 11/1971 | Leonard | 62/141 X |
| 3,626,711 | 12/1971 | Porter et al. | 62/141 |

*Primary Examiner*—William F. O'Dea
*Assistant Examiner*—P. D. Ferguston
*Attorney*—Harry G. Martin, Jr., et al.

[57] ABSTRACT

A two-stage air cooled lithium bromide absorption refrigeration system having a generator a refrigerant condenser, a high pressure absorber coupled with a high temperature evaporator, a low pressure absorber coupled with a low temperature evaporator and an air conditioning fan coil unit for passing cooled refrigerant in heat exchange with air to be cooled is provided with a dilution system for automatically diluting the absorbent solution under conditions of either low ambient temperatures or an inadequately purged low pressure absrober. The dilution system includes a refrigerant sump connected by a dilution passage to a location containing absorbent solution. When the low pressure absorber is poorly purged, the difference in temperature between the intermediate solution and the abmibent air will be reduced. When this difference in temperature is less than a predetermined difference, a value in the dilution passage is opened to pass refrigernat from the sump to the location containing absorbent solution to dilute the solution.

4 Claims, 1 Drawing Figure

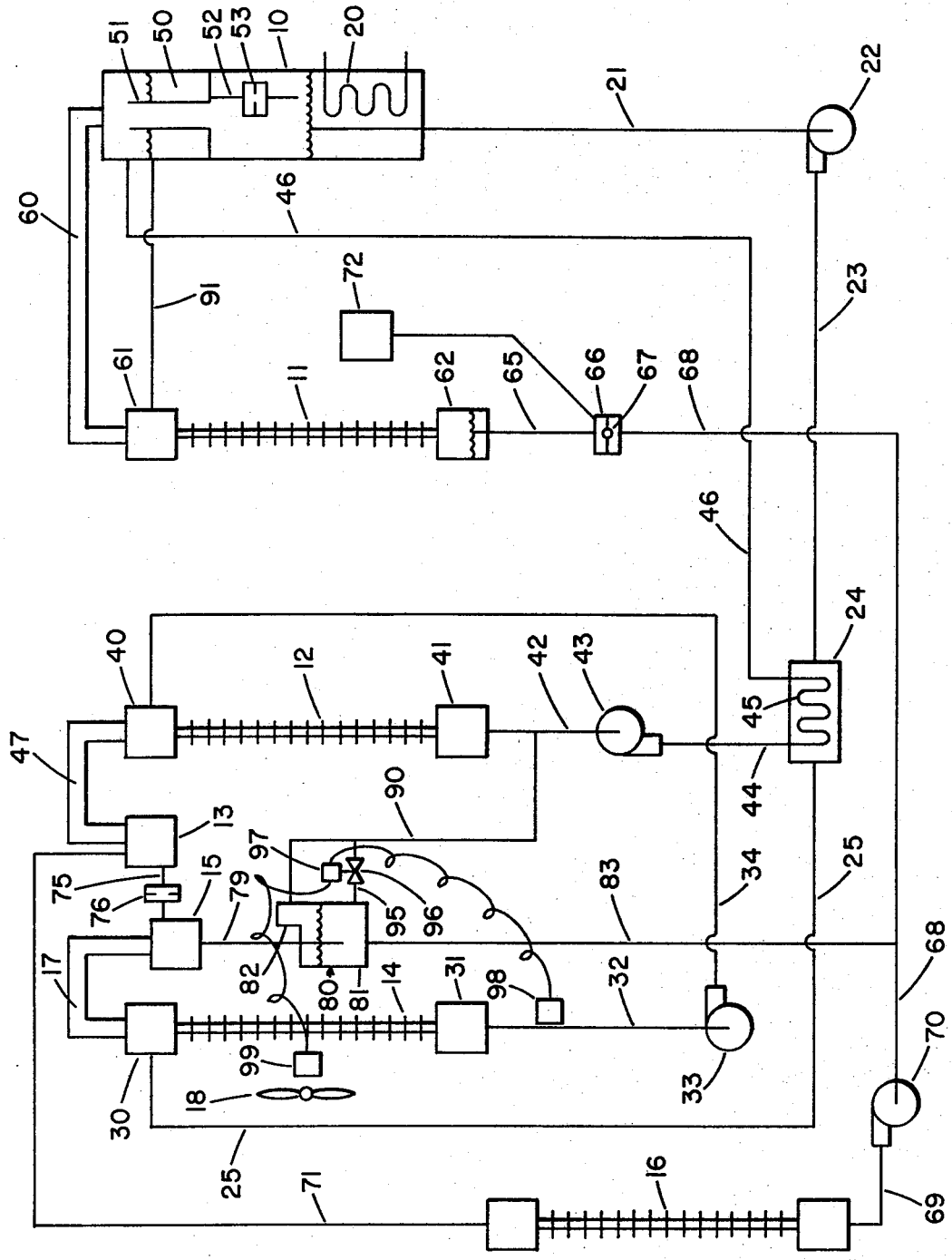

DILUTION SYSTEM FOR ABSORPTION REFRIGERATION SYSTEMS

BACKGROUND OF THE INVENTION

This invention relates to a dilution system for a multiple stage absorption refrigeration system.

Air cooled absorption refrigeration systems are subject to sudden and widely varying changes in the temperature of air passing over the absorber. In systems of the type utilizing lithium bromide as an absorbent solution, it is necessary to restrict the concentration of the absorbent solution so that it will not solidify under normally encountered operating temperatures. However, the existence of even relatively small quantities of noncondensible gases in the absorber reduces the absorption of refrigeration into absorbent solution which may result in solidification of the relatively undiluted solution in the absorber.

Because of the possibility of solidification of the absorbent solution in an air cooled system, it has been necessary to provide some type of dilution arrangement which is effective to limit the concentration of the solution under those condition where the danger of solidification is imminent. It has, therefore, been previously proposed to provide a refrigerant storage tank having an internal pressure which is a function of the absorber cooling medium temperature and arranged so that refrigerant is discharged from the tank into absorbent solution to prevent solidification thereof upon a drop in ambient cooling medium temperature. However, passing absorber cooling air directly over the exterior of a refrigerant storage tank may result in a sluggishly responding dilution control because the effective heat transfer coefficient between air and the refrigerant is relatively low, and it becomes necessary to utilize a relatively large amount of heat transfer surface to obtain the desired speed of response. It has also been discovered that in a multiple stage absorption refrigeration system using relatively strong solution in the low pressure absorber stage, the danger of solidification is surprisingly greater in the intermediate solution passage between the low pressure absorber and the high pressure absorber than in the strong solution passage or the solution heat exchanger, which are the locations most prone to solidification in conventional systems. In accordance with this invention, it has been discovered that the concentration control should be directly responsive to the condition of the intermediate solution for most effective operation in a two-stage machine.

It is an object of this invention to provide an improved dilution system which is more responsive and more effective than prior systems.

SUMMARY OF THE INVENTION

An absorption refrigeration system having a generator, a refrigerant condenser, an evaporator and an absorber is provided with a dilution arrangement which includes a dilution passage and means for sensing the difference in temperature between absorbent solution leaving the absorber and the temperature of cooling medium passing in heat exchange relation with absorbent solution in the absorber.

When absorption of refrigerant vapor in the low pressure absorber is reduced because of the accumulation of noncondensible gases, the temperature of the absorbent solution leaving the absorber is also reduced due to less heat of dilution and condensation being absorbed by the solution in the absorber. Consequently, the difference in temperature between the higher temperature absorbent solution and the absorber cooling medium temperature is reduced. When the temperature difference is reduced below a predetermined temperature difference, a valve opens and refrigerant is passed through the dilution passage to a location effective to dilute the absorbent solution, thereby reducing the likelihood of solidification occurring. A dilution system in accordance with this invention provides immediate response without requiring any additional heat transfer surface, thereby reducing the cost of the system.

Preferably the temperature of the absorbent sensed is that of the intermediate solution in a multiple stage system which it has been discovered, is a more reliable precursor of solidification in a multiple stage absorption refrigeration system than other system conditions previously suggested.

BRIEF DESCRIPTION OF THE DRAWING

The drawing is a schematic illustration of a two-stage absorption refrigeration system embodying a dilution system in accordance with this invention.

DESCRIPTION OF THE PREFERRED EMBODIMENT

A generator 10, a refrigerant condenser 11, a high pressure absorber 12, a high pressure refrigerant evaporator 13, a low pressure absorber 14 and a low pressure evaporator 15 are connected in the illustrated embodiment to provide an absorption refrigeration system. In the system illustrated two evaporator stages of the adiabatic type are employed, which directly cool the refrigerant liquid by evaporating a portion of the refrigerant and the remaining cooled refrigerant passes through an air conditioning heat exchanger 16 such as a fan coil unit to directly cool air being conditioned. Direct expansion or conventional spray type evaporators may be used with suitable modifications in the system. Also, a single stage or more than two stages of evaporation and absorption may be employed.

Water is employed as the refrigerant and an aqueous solution of lithium bromide is employed at the absorbent, although other absorbent refrigerant combinations may be utilized. As used herein, "strong solution" refers to a concentrated absorbent solution which is strong in absorbing power and "weak solution" refers to a diluted absorbent solution which is weak in absorbing power. "Intermediate solution" is used to designate absorbent solution which is intermediate in absorbing power between that of strong and weak solution and in particular to designate the absorbent solution passing from the low pressure absorber to the high pressure absorber. In the illustrated system, the refrigerant condenser and the absorbers are illustrated as being of the air cooled type but other cooling media such as water may be employed by suitably modifying the heat exchanger constructions.

A quantity of absorbent solution in the bottom of generator 10 is boiled by passing a suitable heat source such as steam, hot liquid or flue gas from a fuel burner through heat exchanger 20 in heat exchange relation with the solution. The strong solution formed in generator 10 by vaporization q refrigerant therefrom passes through strong solution passage 21, pump 22, the outside passage of heat exchanger 24 and strong solution passage 25 to the upper header 30 of low pressure absorber 14. The strong solution flows downwardly through a plurality of heat exchange tubes joined by headers 30, 31 forming low pressure absorber 14, in contact with refrigerant vapor passed to absorber 14 through vapor passage 17 from low temperature evaporator 15. The absorbent solution is cooled in absorber 14 by passing a cooling medium such as ambient air by fan 18 over the exterior of the heat exchange tubes of absorber 14. Refrigerant vapor from low temperature evaporator 15 is absorbed into the strong solution as it passes downwardly through the tubes of low pressure absorber 14, thereby diluting the strong solution and forming an intermediate strength solution which collects in lower header 31. The cooling medium absorbs the heat of condensation and heat of dilution introduced by the absorption of refrigerant vapor into the solution and assists the absorption process by cooling the solution to a low vapor pressure.

The intermediate solution passes through intermediate solution passage 32, intermediate solution pump 33, and intermediate solution passage 34 into upper header 40 of high pressure absorber 12. The intermediate solution passes downwardly through the heat exchange tubes of high pressure absorber 12 while being cooled by passage of ambient air thereover, and absorbs additional refrigerant vapor passed from high temperature evaporator 13 through vapor passage 47. The resulting weak solution is collected in weak solution header 41 and passes through weak solution passage 42, weak solution pump 43, weak solution passage 44, the interior passage 45 of solution heat exchanger 25 and weak solution passage 46 to weak solution sump 50. Preferably, pumps 22, 33 and 43 are scoop pumps so as to avoid cavitation problems.

Weak solution sump 50 is preferably located above the heating portion of generator 10 and may be of annular shape surrounding a tubular vapor passage 51 for refrigerant vapor formed in the generator. The weak solution passes from sump 50 by gravity through weak solution passage 52, having a suitable restriction 53, and is discharged into the heating section of generator 10 for reconcentration therein.

Refrigerant vapor formed in generator 10 passes upwardly through tubular vapor passage 51 and refrigerant vapor passage 60 to the vapor header 61 of condenser 11. Condenser 11 may comprise a plurality of vertical heat exchange tubes connected by upper and lower headers located adjacent low pressure absorber 14. While only one refrigerant condenser is illustrated, the system may embody one or more additional parallel connected refrigerant condensers such as one located adjacent high pressure absorber 12 and may employ an additional fan to pass air over high pressure absorber stage 12 and the other condenser section. Air passing over condenser 11 cools refrigerant vapor therein causing the refrigerant to condense and collect in liquid header 62. Liquid refrigerant passes through a condensate passage 65 to a condensate sump 66 containing a refrigerant metering float valve 67. The refrigerant condensate then passes through condensate passage 68 and is pumped by refrigerant pump 70 through refrigerant passage 69, air conditioning heat exchanger 16 and refrigerant passage 71 into the high temperature evaporator 13.

Refrigerant is evaporated in high temperature evaporator 13, thereby cooling the remaining liquid refrigerant. The partially cooled refrigerant passes refrigerant passage 75 containing restriction 76 into low temperature evaporator 15. Additional refrigerant is evaporated from the refrigerant low temperature evaporator 15, thereby cooling the remainder of the liquid refrigerant. The cold liquid refrigerant passes through refrigerant passage 79 into refrigerant sump 80 having a large cross sectional area, lower section 81 and a small cross sectional area upper section 82. The cold refrigerant passes from sump 80 through refrigerant passage 83 and mixes with condensate in passage 68 where it cools the condensate and the cold mixture is pumped through air conditioning heat exchanger 16 by refrigerant pump 70.

A refrigerant overflow passage 90 extends from the small cross section portion 82 of refrigerant sump 80 at a predetermined level therein above the normal refrigerant level, to weak solution passage 42 or some other location containing absorbent solution, preferably at a lower elevation. A solution overflow passage 91 extends from solution sump 50 at a level above the normal solution level to upper header 61 of condenser 11 or other location containing refrigerant. Under low ambient temperature conditions, the level of absorbent solution will rise in sump 50 and will overflow into condenser 11 to reduce the vapor pressure of the refrigerant in the system so as to prevent freezing thereof and maintain a constant evaporator temperature. When ambient temperature rises, after the refrigerant has been diluted with absorbent, the level of diluted refrigerant in sump 80 will rise sufficiently to overflow through passage 90 into the weak solution until most of the absorbent solution has been removed from the refrigerant or until the refrigerant is sufficiently concentrated to provide the desired capacity at the higher ambient temperature condition. A dilution passage 95 containing a dilution valve 96 extends from a location at the bottom of refrigerant sump 80 to overflow passage 90 which connects with weak solution passage 42 containing absorbent solution at a lower elevation. Dilution valve 96 is controlled by a differential dilution thermostat 97 having a first temperature sensor 98 for sensing the temperature of intermediate solution passing from the low pressure absorber 14 to the high pressure absorber 12 and a second temperature sensor 99 for sensing the temperature of the ambient cooling air prior to passage over low pressure absorber 14.

If noncondensible gases accumulate in absorber 14, less refrigerant vapor will be absorbed into the solution in the absorber. This will result in less heat of condensation and heat of dilution being present in the intermediate solution. Consequently, the intermediate solution will be cooled to a lower than normal temperature by the air or other cooling medium used to cool the absorber. Under these conditions there is a possibility of solidification of the intermediate absorbent solution occurring unless the concentration of the solution is reduced. In accordance with this invention, the absorbent solution is diluted by emptying refrigerant from refrigerant sump 80 into a location containing absorbent solution when the possibility of solidification of the absorbent becomes imminent. Refrigerant "sump" 80 may alternatively comprise any location in the system containing refrigerant liquid and need not be a part of the vapor pressure control system as in the preferred embodiment.

It has been found that the temperature difference between the ambient absorber cooling medium and the temperature of the intermediate solution passing from the low pressure absorber to the high pressure absorber is an unexpectedly effective precursor of absorbent solidification. When noncondensible gases in absorber 14 block the normal absorption of refrigerant vapor therein, the temperature of the intermediate solution drops in relation to the temperature of the ambient cooling air so that the temperature difference therebetween is reduced. When a temperature difference less than a predetermined difference is sensed by differential dilution thermostat 97, the thermostat causes valve 96 to open and the liquid refrigerant normally accumulated in refrigerant sump 80 is released via a portion of overflow passage 90 into weak solution passage 42. The refrigerant is then pumped by weak solution pump 43 to generator 10 where it is immediately effective to dilute the generator reservoir 50 and quickly dilute the strong and intermediate strength solution throughout the system.

It has been discovered that the temperature difference between the intermediate solution and the ambient absorber cooling medium is an especially accurate precursor of imminent solidification in a multiple stage system. Further, a dilution system in accordance with this invention is very rapid in responding to an incipient solidification condition because it is triggered by an instantaneously sensed temperature difference and does not require the addition of any heat exchange surface or pressure changes. The dilution arrangement described herein does not require any special circuitry of the ambient cooling medium between the absorber and the condenser, thereby allowing greater design flexibility. While it is preferred to utilize the same sump for vapor pressure control and as a dilution reservoir, it is possible to employ separate sumps. For example, passage 95 containing valve 96 may extend between passage 69, which is actually a refrigerant sump because e contains refrigerant, and passage 42 or sump 50 provided some means is provided to limit the extent of the dilution, such as a float control in sump 80 or a timer so that the dilution is terminated at a desired condition.

It will be noted that by relying on the difference in temperature between the intermediate solution and absorber cooling medium, the system is responsive to abnormal absorber conditions but is relatively less sensitive to variations in the cooling medium temperature alone, so that the absorber cooling medium temperature may vary over a wide range without adversely affecting the effectiveness of the dilution control.

While this invention is especially suitable for use with a multiple stage air cooled absorption refrigeration system, its principles are also applicable to other systems such as a single stage liquid cooled machine. In either event, the difference in temperature between the temperature of the absorbent solution leaving the absorber and the temperature of the medium cooling the absorber is utilized to trigger the dilution system and to commence dilution of the absorbent solution upon the occurrence of a drop in the temperature difference below a predetermined temperature. It will also be apparent that while the temperatures may be directly sensed, they may also be indirectly sensed to provide the desired result. For example, the temperature of the cooling medium leaving the absorber is a function of the temperature of the absorbent solution leaving the absorber. Consequently, the temperature difference between cooling medium entering the absorber and that leaving the absorber may be sensed to provide the refused dilution signal. The temperatures actually sensed need only be functionally related to the described temperatures to provide an effective dilution control signal in accordance with this invention. In the multiple stage system described, the difference between the temperature of air passing to the low pressure absorber and the temperature of air passing from the low pressure absorber may be sensed to provide the signal to valve 96.

While a preferred embodiment of this invention has been described, it will be appreciated that the invention may be otherwise embodied in the scope of the following claims.

I claim:

1. An absorption refrigeration system comprising:
   A. a generator for concentrating absorbent solution by heating the solution and vaporizing refrigerant therefrom;
   B. a refrigerant condenser for condensing refrigerant vapor formed in the generator;
   C. an evaporator for evaporating refrigerant to produce a refrigeration effect;
   D. an absorber for absorbing refrigerant vapor evaporated in the evaporator into absorbent solution discharged from the generator; and
   E. means for passing a cooling medium in heat exchange relation with absorbent solution in said absorber;

wherein the improvement comprises:
   H. dilution means including:
      1. dilution passage means extending between a location in said system containing refrigerant and a location is said system containing absorbent solution;
      2. dilution valve means in said dilution passage for controlling the passage of refrigerant from said location containing refrigerant through said dilution passage means to said location containing absorbent solution;
      3. dilution thermostat means, said thermostat means including a first temperature sensing means for sensing a temperature which is a function of the temperature of absorbent solution passing from said absorber, and a second temperature sensing means for sensing a temperature which is a function of the temperature of the cooling medium passing to the absorber; and
      4. control means for opening said dilution valve in response to a decrease in the difference between the two temperatures sensed by said dilution thermostat means below a predetermined temperature difference to thereby dilute the absorbent solution in said system.

2. An absorption refrigeration system comprising:
   A. a generator for concentrating absorbent solution by heating the solution and vaporizing refrigerant therefrom;
   B. a refrigerant condenser for condensing refrigerant vapor formed in the generator;
   C. a low temperature evaporator for evaporating refrigerant at a relatively low temperature to produce a refrigeration effect;
   D. a low pressure absorber for absorbing refrigerant vapor evaporated in the low temperature evaporator into strong absorbent solution discharged from the generator;
   E. a high temperature evaporator for evaporating refrigerant at a relatively higher temperature to produce a refrigeration effect;
   F. a high pressure absorber for absorbing refrigerant vapor evaporated in the high temperature evaporator into intermediate strength absorbent solution discharged from the low pressure absorber; and
   G. means for passing a cooling medium in heat exchange relation with absorbent solution in said absorbers:
   wherein the improvement comprises:
   H. dilution means including:
      1. dilution passage means extending between a location in said system containing refrigerant and a location in said system containing absorbent solution;
      2. dilution valve means in said dilution passage for controlling the passage of refrigerant from said location containing refrigerant through said dilution passage means to said location containing absorbent solution;
      3. dilution thermostat means, said thermostat means including a first temperature sensing means for sensing a temperature functionally related to the temperature of intermediate strength absorbent solution passing from said low pressure absorber to said high pressure absorber, and a second temperature sensing means for sensing a temperature functionally related to the temperature of the cooling medium passing to the absorber; and
      4. control means for opening said dilution valve in response to a decrease in the difference between the two temperatures sensed by said dilution thermostat means below a predetermined temperature difference to dilute the absorbent solution in said system, and for closing the dilution valve in response to an increase in the difference between the two temperatures sensed by said thermostat means above a predetermined temperature difference.

3. A method of producing refrigeration and operating an absorption refrigeration system having a generator, a condenser, an evaporator, and an absorber, which comprises:
   A. heating weak absorbent solution in the generator to concentrate it by vaporizing refrigerant therefrom;
   B. condensing in the condenser refrigerant vapor formed in the generator;
   C. evaporating liquid refrigerant in the evaporator to produce refrigeration;
   D. absorbing refrigerant vapor formed in the evaporator into absorbent solution in the absorber;
   E. passing a cooling medium in heat exchange relation with absorbent solution in the absorber;
   wherein the improvement comprises:
   F. sensing a first temperature which is a function of the temperature of solution discharged from the absorber;
   G. sensing a second temperature which is a function of the temperature of the cooling medium passing to the absorber; and
   H. diluting absorbent solution by passing liquid refrigerant from a location in said system containing refrigerant to a location in said system containing absorbent solution upon sensing a difference between said first and second sensed temperatures below a predetermined difference.

4. A method of producing refrigeration and operating an absorption refrigeration system having a generator, a condenser, a low temperature evaporator, a low pressure absorber, a high temperature evaporator, and a high pressure absorber, which comprises:
   A. heating weak absorbent solution in the generator to concentrate it by vaporizing refrigerant therefrom;
   B. condensing in the condenser refrigerant vapor formed in the generator;
   C. evaporating liquid refrigerant in the high temperature evaporator and in the low temperature evaporator to produce refrigeration;
   D. absorbing refrigerant vapor formed in the high temperature evaporator into absorbent solution in the high pressure absorber, and absorbing refrigerant vapor formed in the low temperature evaporator into absorbent solution in the low pressure absorber;
   E. passing a cooling medium in heat exchange relation with absorbent solution in the absorbers;
   wherein the improvement comprises;
   F. sensing a first temperature which is a function of the temperature of intermediate solution passing from the low pressure absorber to the high pressure absorber;
   G. sensing a second temperature which is a function of the temperature of the cooling medium passing to the absorber; and
   H. diluting absorbent solution by passing liquid refrigerant from a location in said system containing refrigerant to a location in said system containing absorbent solution upon sensing a difference between said first and second sensed temperatures below a predetermined difference.

* * * * *